(12) United States Patent
Dageville et al.

(10) Patent No.: US 7,779,008 B2
(45) Date of Patent: Aug. 17, 2010

(54) PARALLEL PARTITION-WISE AGGREGATION

(75) Inventors: Benoit Dageville, Foster City, CA (US); Bhaskar Ghosh, Burlingame, CA (US); Rushan Chen, Belmont, CA (US); Thierry Cruanes, Foster City, CA (US); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1511 days.

(21) Appl. No.: 11/060,260

(22) Filed: Feb. 16, 2005

(65) Prior Publication Data

US 2006/0182046 A1 Aug. 17, 2006

(51) Int. Cl.
*G06F 17/30* (2006.01)

(52) U.S. Cl. ....................... 707/737; 707/764

(58) Field of Classification Search .............. 707/2
See application file for complete search history.

(56) References Cited

U.S. PATENT DOCUMENTS

| | | | | |
|---|---|---|---|---|
| 5,551,027 A * | 8/1996 | Choy et al. | ................. | 707/201 |
| 5,721,928 A * | 2/1998 | Umehara et al. | ............ | 717/149 |
| 5,765,011 A * | 6/1998 | Wilkinson et al. | ............. | 712/20 |
| 5,822,751 A * | 10/1998 | Gray et al. | ...................... | 707/3 |
| 5,857,180 A * | 1/1999 | Hallmark et al. | ................ | 707/2 |
| 5,909,681 A * | 6/1999 | Passera et al. | .................. | 707/8 |
| 6,003,036 A * | 12/1999 | Martin | ....................... | 707/102 |
| 6,014,656 A * | 1/2000 | Hallmark et al. | ................ | 707/2 |
| 6,065,065 A * | 5/2000 | Murakami et al. | ..... | 707/E17.01 |
| 6,101,495 A * | 8/2000 | Tsuchida et al. | ................ | 707/4 |
| 6,141,655 A * | 10/2000 | Johnson et al. | ................ | 707/2 |
| 6,311,265 B1 * | 10/2001 | Beckerle et al. | ............. | 712/203 |
| 6,334,125 B1 * | 12/2001 | Johnson et al. | ................ | 707/3 |
| 6,415,286 B1 * | 7/2002 | Passera et al. | .................. | 707/6 |
| 6,430,550 B1 * | 8/2002 | Leo et al. | ........................ | 707/2 |
| 6,505,187 B1 * | 1/2003 | Shatdal | ......................... | 707/2 |
| 6,609,131 B1 * | 8/2003 | Zait et al. | .................... | 707/102 |
| 6,687,798 B1 * | 2/2004 | Thusoo et al. | .............. | 711/154 |
| 6,732,110 B2 * | 5/2004 | Rjaibi et al. | ................ | 707/101 |

(Continued)

OTHER PUBLICATIONS

Shatdal et al. "Adaptive Parallel Aggregation Algorithms", 1995.*

(Continued)

*Primary Examiner*—Neveen Abel Jalil
*Assistant Examiner*—Son T Hoang
(74) *Attorney, Agent, or Firm*—Hickman Palermo Truong & Becker LLP

(57) ABSTRACT

Techniques are provided for performing a parallel aggregation operation on data that resides in a container, such as a relational table. During generation of the execution plan for the operation, it is determined whether partition-wise aggregation should be performed, based on the grouping keys involved in the aggregation and the partition keys used to partition the container. If partition-wise aggregation is to be performed, then the assignments given to the slave processes that are assigned to scan a container are made on a partition-wise basis. The scan slaves themselves may perform full or partial aggregation (depending on whether they are the only scan slaves assigned to the partition). If the scan slaves perform no aggregation, or only partial aggregation, then the scan slaves redistribute the data items to aggregation slaves that are local to the scan slaves.

26 Claims, 2 Drawing Sheets

U.S. PATENT DOCUMENTS

| | | | |
|---|---|---|---|
| 6,775,682 B1 * | 8/2004 | Ballamkonda et al. | 707/102 |
| 6,944,633 B1 * | 9/2005 | Higa et al. | 707/104.1 |
| 7,272,612 B2 * | 9/2007 | Birdwell et al. | 707/101 |
| 2002/0059203 A1 * | 5/2002 | Witkowski et al. | 707/3 |
| 2002/0129032 A1 * | 9/2002 | Bakalash et al. | 707/101 |
| 2002/0143783 A1 * | 10/2002 | Bakalash et al. | 707/100 |
| 2002/0184187 A1 * | 12/2002 | Bakalash et al. | 707/1 |
| 2002/0194157 A1 * | 12/2002 | Zait et al. | 707/2 |
| 2003/0028509 A1 * | 2/2003 | Sah et al. | 707/1 |
| 2003/0081833 A1 * | 5/2003 | Tilton | 382/173 |
| 2004/0006574 A1 * | 1/2004 | Witkowski et al. | 707/104.1 |

OTHER PUBLICATIONS

Rao et al. "Automating Physical Database Design in a Parallel Database", Jun. 2002.*

Unrau et al. "Hierarchical Clustering: A Structure for Scalable Multiprocessor Operating System Design", Jun. 1994.*

Oracle, "Database Performance with Oracle Database 10g Release 2," White Paper, May 2005, retrieved from internet at <http://oracle.com/technology/deploy/performance/pdf/twp_perf_database%2-performance%20with%oracle10gr2.pdf>, retrieved on Oct. 28, 2005, pp. 3-29.

Oracle, "5 Parallelism and Partitioning in Data Warehouses," Oracle Database Data Warehousing Guide Release 1 (10.1), retrieved from internet at <http://:dbtune.com/docs/10.1/server.101/b10736-parpart.htm>, retrieved on Oct. 28, 2005, 36 pages.

* cited by examiner

PARALLEL PARTITION-WISE AGGREGATION

FIELD OF THE INVENTION

The present invention relates to aggregation operations and, more specifically, to parallelizing aggregation operations.

BACKGROUND

Queries commonly involve operations, such as sort and aggregation, which, if computed in parallel, require data to be redistributed from one set of slave processes to another set of slave processes. For example, a parallel sort operation may involve a set of table scan slaves and a set of sort slaves. The table scan slaves read data items from a table. Each of the sort slaves is assigned a value range. The table scan slaves redistribute the data items to the sort slaves based on (a) the sort key values of the items and (b) the ranges assigned to the sort slaves. Each sort slave then sorts the data items that the sort slave receives from the table scan slaves.

The bundle of operations that is assigned to a particular slave set is referred to herein as a DFO (Data Flow Operation). Thus, boundaries between DFOs represent points at which data items may be redistributed from one slave set and to another slave set.

The redistribution of data between DFOs can be very costly, since the DFOs might be executed by slave sets on different nodes. When data items are redistributed between nodes, network I/O contributes significantly to the completion time of the query.

For example, this query (Q1): select avg(sal) from emp group by deptno, mgr over table emp partitioned on deptno column, has the following execution plan, with Query Coordinator represented by QC and Parallel Execution represented by PX:

| Operation | Name | TQ | IN-OUT | PQDistrib |
|---|---|---|---|---|
| SELECT STATEMENT | | | | |
|   PX COORDINATOR | | | | |
|     PX SEND QC (RANDOM) | :TQ10001 | 01 | P->S | QC(RANDOM) |
|       HASH GROUP BY | | 01 | PCWP | |
|       PX RECEIVE | | 01 | PCWP | |
|         PX SEND HASH | :TQ10000 | 00 | P->P | HASH |
|           PX BLOCK ITERATOR | | 00 | PCWC | |
|             TABLE ACCESS FULL | EMP | 00 | PCWP | |

Like in the classical rowsource or iterator execution model, the execution plan is started top-down, each parent opening and fetching from its child iterators and the rows flow from the bottom-up the iterator tree in a demand-driven manner. Thus, at the bottom of the iterator tree a set of table scan slaves scan table EMP (TABLE ACCESS FULL). The table scan slaves iterate until all rows of EMP have been scanned (PX BLOCK ITERATOR), and then redistribute the rows using a hash distribution (PX SEND HASH).

The rows are received by a set of group by slaves (PX RECEIVE). The group by slaves group the values based on the grouping key (HASH GROUP BY). The group by slaves then send their results to a query coordinator (PX SEND QC (RANDOM)).

In the preceding example, between the table scan slaves and the group-by slaves, all the rows from EMP are redistributed based on the grouping key. This redistribution may be costly, particularly if some or all of the table scan slaves reside on different nodes than the group-by slaves.

Another performance concern for the above plan is the amount of memory used for the aggregation. If sort aggregation is used, the number of rows sorted by each aggregation slave will be approximately the number of rows in the table (num_rows_table) divided by the degree of parallelism (DOP). This number can be very large, and might not fit into the volatile memory available to the slave for performing the operation. In this context, the degree of parallelism is the number of aggregation slaves. If persistent storage is used to perform the sort aggregation, multiple passes through the disk will be required, and that affects the performance of the sort.

One way to reduce the amount of data items that need to be redistributed between slave groups is referred to herein as a push-down aggregation technique. Using the push-down aggregation technique, the table scan slaves perform partial aggregation prior to redistributing the data items to the aggregation slaves. Using the push-down aggregation approach, the parallel plan for query Q1 may look like:

| Operation | Name | TQ | IN-OUT | PQ Distrib |
|---|---|---|---|---|
| SELECT STATEMENT | | | | |
|   PX COORDINATOR | | | | |
|     PX SEND QC (RANDOM) | :TQ10001 | 01 | P->S | QC (RAND) |
|       HASH GROUP BY | | 01 | PCWP | |
|       PX RECEIVE | | 01 | PCWP | |
|         PX SEND HASH | :TQ10000 | 00 | P->P | HASH |
|           HASH GROUP BY | | 00 | PCWP | |
|             PX BLOCK ITERATOR | | 00 | PCWC | |
|               TABLE ACCESS FULL | EMP | 00 | PCWP | |

Because partial aggregation is performed by the table scan slaves, only the partially aggregated data needs to be redistributed. Under some conditions, the partially aggregated data may be significantly less than the original input data. Doing a preliminary aggregation before the redistribution can significantly reduce the TQ traffic if the number of rows with identical grouping key values is large enough, since each slave in the scan DFO is now outputting only one row per group.

Unfortunately, the push-down aggregation technique is less helpful when each table scan slave encounters few identical group-by values. Even though many rows may have the same group-by value, if those rows are scanned by different table scan slaves, the partial aggregation performed by the table scan slaves will not reduce the number of rows, from that group, that will have to be redistributed to the aggregation slaves.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
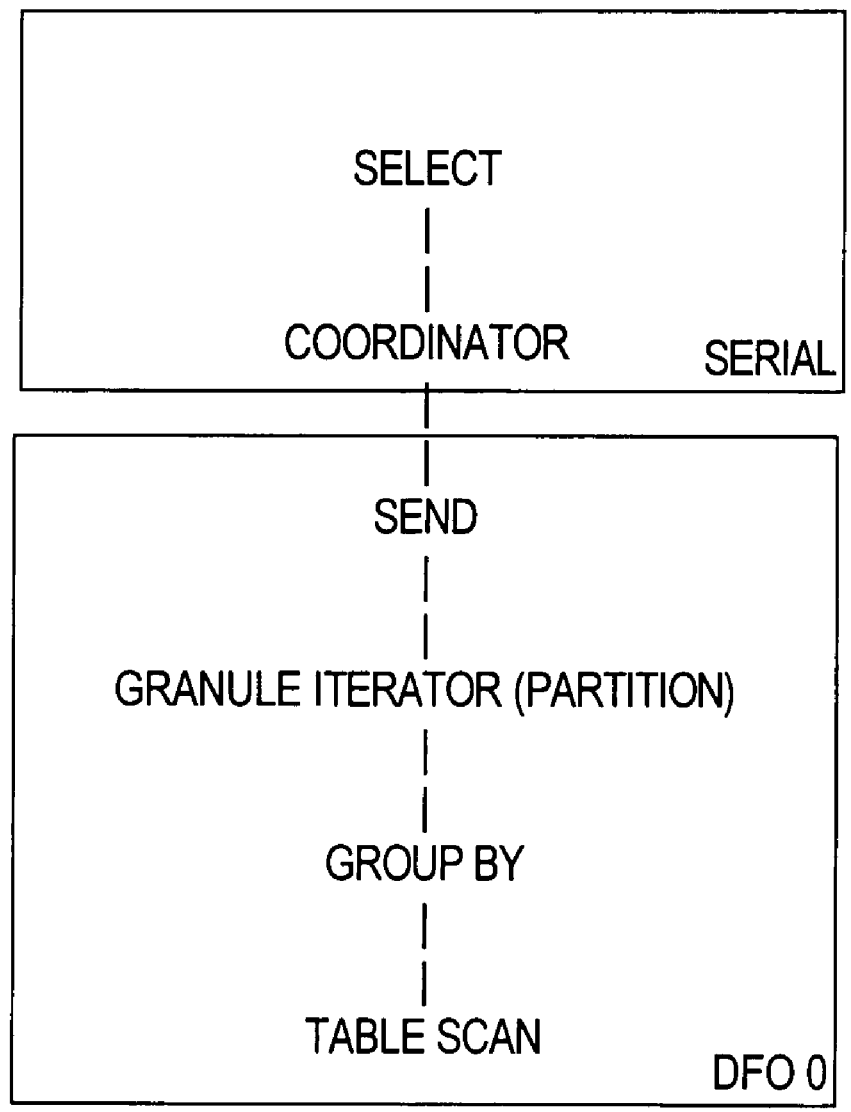
FIG. 1 is a block diagram of an execution plan in which the scan assignments are made based on partition boundaries, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

As mentioned above, performance improvement for a parallel aggregation operation can come from reducing the amount of data to be redistributed and/or reducing the input data size for each round of the aggregation. The "partition-wise aggregation" technique described hereafter may reduce both the distribution cost and the sort space (memory or temporary disk space) usage. The technique applies to aggregation over partitioned tables, if the partition key is related to a subset of the aggregation key.

For example, consider the situation in which query Q1, which requires aggregation over (deptno, mgr), is issued against a table EMP that is partitioned on deptno. This example represents a common usage scenario among data warehouse users, who frequently query the aggregated values of certain fields based on grouping keys that include the partition key as a subset of the aggregation key.

The partition-wise aggregation technique involves establishing the table scan assignments based on the partitions, where the table scan assignments dictate which portions of the table are to be scanned by each table scan slave. In particular, the table scan assignments are made in a way that guarantees that if a slave scans any data item for a particular group, then the slave will scan all data items for the particular group. Each table scan slave then scans one or more portions of the table based on the assignments, and performs the aggregation operation on the data items that are scanned by the slave. In the iterator-based model, the granule iterator (one embodiment of which shows up as PX BLOCK ITERATOR in the plans above) controls what subset of each table is scanned completely by an individual slave. For partition-wise aggregation, the granule iterator will specify or generate a granule corresponding to each partition of the underlying table.

Because all of the rows in a group will be seen by the same table scan slave, a second round of aggregation need not be performed by another set of slaves. Thus, the amount of inter-node traffic between slave sets is reduced. In addition, a table scan slave will only see rows from a subset of the groups, thereby increasing the likelihood that a table scan slave will be able to combine the rows that the table scan slave scans. Consequently, the amount of memory required to perform the aggregation will typically decrease.

Partition-wise aggregation removes the need to redistribute data between (1) input to an aggregation and (2) the aggregation itself. This alone reduces the completion time of a query. Now aggregation can be done in the same DFO that produces the input to the aggregation. This can potentially reduce the number of DFOs required for the query. In the simple case of a query originally having two DFOs, only one slave set needs to be acquired now instead of two.

Since aggregation needs to iterate through partial results stored on disk when the input data set cannot fit into the volatile memory, by aggregating over a smaller data set (a partition) at a time rather than over the entire redistributed input, partition-wise aggregation also tends to reduce the temporary space usage and the time spent doing disk I/O.

Further, partition-wise aggregation maintains the clustering and ordering property of the data (on the grouping columns or expressions) beyond aggregation, thus increasing the possibility of combining other operations, such as the grouping set explosion operation with the GROUP BY and allow them to be computed on the same slave set inside the aggregation DFO without need for further redistribution of data.

For a common usage scenario of aggregation over partitioned table where the partition key is a subset of the grouping key, partition-wise aggregation improves performance of aggregation over large data sets, by reducing the sort memory usage or temporary space usage, disk I/O and interconnect data messages.

Partition-Wise Aggregation

For partitioned tables, because scans of base objects produce rows clustered on the partition key, the cost of redistribution and the memory consumption can be reduced by doing partition-wise aggregation. If the aggregation is over a subset of the data from a partition (i.e. the partition key is a subset of the grouping key), data redistribution can be avoided if the aggregation is done inside the same DFO as the scan. For example, the query Q1 can compute aggregation inside each partition without data redistribution when compiled into the following plan:

| Operation | Name | TQ | IN-OUT | PQDistrib |
|---|---|---|---|---|
| SELECT STATEMENT | | | | |
|   PX COORDINATOR | | | | |
|     PX SEND QC (RANDOM) | :TQ10000 | 00 | P->S | QC(RANDOM) |
|       PX PARTITION RANGE ALL | | 00 | PCWC | |
|         HASH GROUP BY | | 00 | PCWP | |
|           TABLE ACCESS FULL | EMP | 00 | PCWP | |

In this plan, the EMP table is accessed by slaves one partition at a time. The input to the aggregation is clustered on deptno, which means all rows with the same (deptno, mgr) value pairs will be seen by the same scan slave. Each slave can compute the complete aggregation over group-by (deptno, mgr) without having to redistribute rows.

In this plan, each aggregation slave is sorting on rows from one partition at a time, rather than the redistributed rows from the whole table (which is num_rows_table/DOP). The maximum sort space consumption is less if max_rows_partition is less than num_rows_table/DOP.

FIG. 1 is a block diagram that graphically illustrates an execution plan that uses partition-wise parallelization of an aggregation operation. Referring to FIG. 1, there is only one DFO (DFO 0), which reflects the fact that only one set of slaves is required to do both the table scan and the aggregation.

Specifically, each of the slaves in the single slave set performs the operations specified in DFO 0. Namely, each slave performs a table scan of its currently assigned partition, performs the aggregation on those rows that it scanned, and sends the results to the coordinator. If more work needs to be assigned, then the slave is assigned one or more previously unscanned partitions.

Because the partition key is a subset of the grouping key, rows can only possibly group with rows that belong to the same partition. Because rows can only possibly group with rows that belong to the same partition, and each slave scans all of the rows in the partitions that it is assigned, each slave is able to complete the aggregation operation relative to all of the rows that it scans. Because no further aggregation is required, the slaves provide their results back to the coordinator. No second slave set is required, so there is no redistribution of the data between slave sets.

Heirarchical Group-By Criteria

As explained above, partition-wise aggregation may be performed when the partition key is a subset of the grouping key. For example, assume that grouping key is (quarter, product_id). Under these circumstances, partition-wise aggregation may be performed if the partition key is (quarter), if the partition key is (product_id), or if the partition key is (quarter, product_id).

In addition, partition-wise aggregation may be performed when the partition key has a hierarchical relationship to a grouping key. In the example given above, the grouping key "quarter" belongs to the "time" hierarchy. "Year" is above "quarter" in the time hierarchy, and "month" is below "quarter" in the time hierarchy. Thus, given a grouping key of (quarter, product_id), partition-wise aggregation may still be used when the partition key is (month), and when the partition key is (year). Each of these situations shall be described in greater detail below.

Higher-Level Partition Keys

As mentioned above, partition-wise aggregation may be performed when the partition key is above one of the grouping keys, relative to some hierarchical relationship. For example, assume that the grouping key is (quarter, product_id) and the partition key is (year). If rows belong to the same quarter, then they also belong to the same year. Therefore, the grouping key (quarter, product_id) will never combine a row that belongs to one "year" partition with a row that belongs to another "year" partition. Therefore, assigning work to slaves on a per-partition basis ensures that each of the scan slaves will be able to complete the aggregation operation on the rows that it receives, and no second set of slaves is required for performing the aggregation operation.

Lower-Level Partition Keys and Virtual Partitions

As mentioned above, partition-wise aggregation may be performed when the partition key is below one of the grouping keys, relative to some hierarchical relationship. The hierarchical relationship may be the result of explicit or implicit dependencies.

The "time" dimension is an example of a dimension that has several hierarchical levels (century, decade, year, quarter, month, day, hour, etc.). For the purpose of explanation, assume that the grouping key of a query is (quarter, product_id) and the partition key of the table against which the query is executed is (month). Under these circumstances, the rows for a particular quarter are spread among three separate "month" partitions. For the purpose of partition-wise aggregation, the three "month" partitions that contain rows for a particular quarter may be treated as a virtual "quarter" partition. Slaves may then be assigned work on a virtual-partition by virtual-partition basis, to ensure that, if a slave scans any row that belongs to a group, the slave is guaranteed to scan all rows that belong to the group.

For the purpose of illustration, assume that six "month" partitions exist, which correspond to the months of January through June of a particular year. Assume further that the grouping key is (quarter). Under these circumstances, a first slave may be assigned to scan the three partitions associated with January through March, while the second slave is assigned to scan the three partitions associated with April through June.

While the examples given herein relate to levels of the "time" dimension, the technique is not limited to any particular hierarchical dimension. For example, the technique may be applied equally to the geographic dimension (e.g. country, region, state, city) or any other hierarchical dimension where the boundaries of the higher level elements coincide with boundaries between the lower level elements.

Freeing Memory

According to one embodiment, scan slaves work on one partition (or virtual partition) at a time, and send the aggregation results of a partition as soon as they have completed the aggregation operation on the rows of the partition. After the aggregation results of one partition are sent, the memory used by the scan slave to perform the aggregation operation on the partition, and to store the results thereof, can be freed up and reused to perform the aggregation operation on the rows of another partition.

The technique of having each slave work on one partition at a time, and send the results to free up the memory, may be employed even under circumstances where a single assignment involves multiple partitions. For example, assume that a particular slave is assigned to scan partitions A and B. Using the one-partition-at-a-time technique, the slave may scan partition A, combine the rows of partition A based on the grouping key, and send the results before starting the scan of partition B.

Composite Partitioning

Some systems allow containers to be partitioned at more than one level. For example, the same table may be hash partitioned based on "month", and range partitioned based on "product-id". Partitioning in this manner is referred to as composite partitioning. One technique for composite partitioning is described, for example, in U.S. Pat. No. 6,665,684.

The partition-wise aggregation techniques described herein may be performed based on the partitions of any level of a composite-partitioned container. For example, if the first level of partitioning is month, and the second level of partitioning is product-id, then the first level of partitions may be used for partition-wise aggregation for queries whose grouping key includes month, and the second level of partitions may be used for partition-wise aggregation for queries whose grouping key includes product-id.

In this example, if both month and product-id are grouping keys in a query, then the subpartitions of the table (the partitions of the partitions) may be used as the basis for making the scan assignments for the partition-wise aggregation operation.

Load Balancing

In the execution plan described above, the table scan slaves receive partition granules rather than block granules. Partition granules can be of different sizes, since partitions can vary in size. The slaves may be load balanced so that the completion time of the query will be determined by the slave receiving the largest share of data.

According to one embodiment, to make sure each slave processes roughly the same amount of data, the heuristic rule of (num_partition>2*DOP) is used to decide whether partition-wise aggregation should be chosen. If the number of partitions is a lot more than the number of slaves, it is likely that slaves will be dynamically load balanced based on its processing rate, thus mitigating the impact of the difference in partition sizes.

Choosing Between Plans

If a table is partitioned, and the partition key is a subset of the grouping key, then it is possible to execute a query based on an unoptimized execution plan, an execution plan that uses the push-down aggregation approach, or a partition-wise aggregation plan, as described above. According to one embodiment, the database server chooses which plan to use based on the estimated costs associated with each plan. The factors used by the database server to make this determination may include, for example, the reduction factor (the average number of rows per group i.e. having the same grouping key).

For example, the push-down plan normally performs better than the unoptimized plan unless the reduction factor is low, i.e. there are very few rows with the same grouping key. With a low reduction factor, the scan and preaggregation slaves will end up redistributing data close to the original input in size and the aggregation work will have to be done again by the aggregation slaves. For large data sets, the aggregation normally becomes external (i.e. has to make use of disk storage) since the entire sort cannot be done in the amount of volatile memory that is available for the sort operation.

According to one embodiment, a runtime adaptation from the push-down plan to the unoptimized plan will occur if a scan slave detects that the sort is spilling to disk to avoid doing a costly external sort twice (once in scan slaves and once in aggregation slaves).

If num_rows_table/DOP fits in the memory, then the push-down plan will perform better than the unoptimized plan. If, in addition, max_rows_partition is less than num_rows_table/DOP, then the partition-wise aggregation plan will typically outperform the push-down plan, because there is no redistribution at all and the sort also performs better since it sorts on smaller data set (at most max_rows_partition) at a time.

If num_rows_table/DOP does not fit in the memory, then the unoptimized plan is effectively the run-time plan. Partition-wise aggregation will typically perform better than the unoptimized plan if the same condition of max_rows_partition<num_rows_table/DOP holds true, since the aggregation sort is done on a smaller data set at a time and the redistribution is removed.

Under certain conditions, the estimates for max_rows_partition and num_rows_table might be inaccurate. In this case, a load balancing requirement of num_partition>2*DOP provides a close substitute, because it is likely that max_rows_partition is less than (2*num_rows_table/num_partition) which is in turn less than num_rows_table/DOP.

Partition-Wise Partial Aggregation with Slave Clusters

In the examples given above, scan slaves are assigned work on a partition-by-partition basis (using either actual or virtual partitions), thereby assuring that a single slave will scan all of the rows of any given group. Because, for each group, all rows will go to a single slave, the rows do not need to be redistributed to a set of aggregation slaves.

Unfortunately, the one-slave-per-partition restriction may not be desirable under certain circumstances. For example, consider an aggregation operation involving a few very large partitions in a system that supports a very high degree of parallelism. Under these circumstances, it may be desirable to have multiple slaves assigned to the each partition.

According to one aspect of the invention, even under these conditions, the scan assignments are still made in a manner that takes into account the partition boundaries. Specifically, the scan slaves are grouped into "slave clusters", and the partitions are assigned to the slave clusters on a partition-by-partition basis. By assigning work in this manner, for each group, all rows will go to a single slave cluster. However, all rows for a given group may not go to the same slave within the slave cluster.

Because the rows for a given group do not necessarily go to the same slave within a slave cluster, the aggregation performed by the slaves in the slave cluster is only partial aggregation. To complete the aggregation operation, the partial results produced by the slaves in a slave cluster are sent to a slave that belongs to a second slave set. The slaves in the second slave set complete the aggregation operation.

Partition-wise partial aggregation may achieve better results than the push-down aggregation technique because the assignments are made such that each scan slave will only scan rows for a subset of the groups. Consequently, scan slaves will usually be able to combine more of the rows than they would have been able to combine if their assignment was not based on partition boundaries.

For example, assume that a slave cluster is assigned to each of twenty partitions. Assume that each slave cluster includes two scan slaves. Further assume that the grouping key results in twenty groups per partition. Under these conditions, each scan slave scans rows from twenty groups. In contrast, if the work assignments were not based on the partition boundaries, each scan slave would scan rows from four hundred groups.

Because the scan slaves only perform partial aggregation, a second set of slaves is required. However, because the scan assignments were made on a partition-by-partition basis, the rows produced by the slaves in one slave cluster will not combine with the rows produced by the slaves in other slave clusters. The fact that rows from different slave clusters do not combine may be exploited by locating near each other (1) the slaves of a slave cluster and (2) the aggregation slave that will complete the aggregation operation.

For example, all of the slaves within the same slave cluster may be executed on the same node. Each slave cluster, on the other hand, may be executing on a different node than the other slave clusters. The aggregation slave that consumes the rows of a given slave cluster may be executed on the same node as the slave cluster. Thus, while there is a redistribution of rows from the scan slaves to the aggregation slaves, and multiple nodes are involved in the aggregation operation, the redistribution itself does not involve inter-node communications. Specifically, the redistribution may be performed efficiently via local shared memory.

Partition-Wise Redistribution with Slave Clusters

In the example given above, the scan slaves within the slave clusters perform partial aggregation, and the aggregation slaves complete the aggregation operation. However, some benefits are still achieved when the slaves within the slave clusters do not perform partial aggregation.

As explained above, because the scan assignments were made on a partition-by-partition basis, the rows produced by the scan slaves in one slave cluster will not combine with the rows produced by the scan slaves in other slave clusters. Thus, even when the scan slaves do not perform partial aggregation, the fact that rows from different slave clusters do not combine may be exploited by locating near each other (1) the slaves of a slave cluster and (2) the aggregation slave that will perform the aggregation operation on the rows produced by the cluster. For example, the aggregation slave that consumes the rows of a given slave cluster may be executed on the same node as the slave cluster. Thus, while there is a redistribution of rows from the scan slaves to the aggregation slaves, and multiple nodes are involved in the aggregation operation, the redistribution itself does not involve inter-node communications.

Hardware Overview

Figure 2:
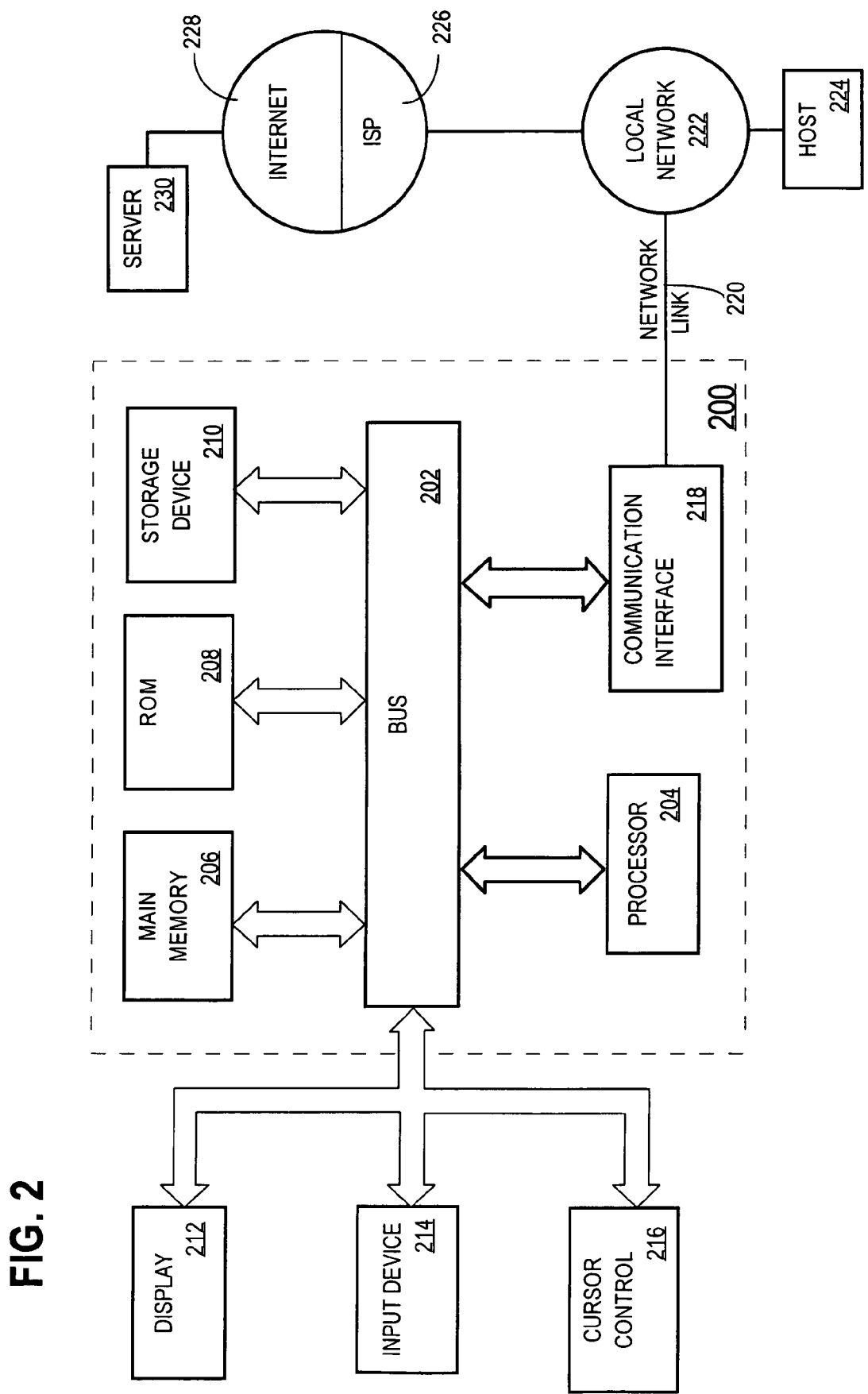
FIG. 2 is a block diagram upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of performing, in parallel, an aggregation operation on data items that reside in one or more containers stored on non-volatile storage, wherein the aggregation operation aggregates the data items based on groups established by one or more grouping keys, the method comprising:
   determining that at least one of the one or more grouping keys is related to at least one partition key used to establish partitions of the one or more containers;
   in response to determining that at least one of the one or more grouping keys is related to at least one partition key, based on the partitions, establishing scan assignments that dictate which portions of the one or more containers are to be scanned by each slave cluster of a plurality of slave clusters, wherein each slave cluster includes one or more slaves;
   establishing said scan assignments for the slave clusters on a partition-by-partition basis, such that no two slave clusters are assigned to scan the same partition;
   each slave cluster of the plurality of slave clusters scanning one or more portions of the one or more containers based on the scan assignments; and
   based on the one or more grouping keys, aggregating the data items scanned by the plurality of slave clusters;
   wherein said scan assignments guaranty that when a particular slave cluster of the plurality of slave clusters scans any data item for a particular group established by the one or more grouping keys, then the particular slave cluster will scan all data items for the particular group;
   wherein the method is performed by one or more computing devices programmed to be special purpose machines pursuant to program instructions.

2. The method of claim 1 wherein the step of aggregating is performed by each slave of the plurality of slaves on the data items that are scanned by the slave.

3. The method of claim 2 wherein the step of establishing scan assignments includes, for each partition of the container, assigning a single slave of the plurality of slaves to scan all rows of the partition.

4. The method of claim 2 wherein:
   a particular slave receives an assignment that involves multiple partitions; and
   the particular slave performs scans and aggregates data items from the multiple partitions one partition at a time, and sends the results of aggregating the data items of one partition before starting to scan any other partition.

5. The method of claim 2 wherein said scan assignments guaranty that when any slave scans any data item for a particular group, then that slave will scan all data items for the particular group.

6. The method of claim 1 wherein the step of determining that at least one of the one or more grouping keys is related to at least one partition key includes determining that the at least one grouping key is hierarchically related to the at least one partition key.

7. The method of claim 6 wherein:
   the at least one partition key is below the at least one grouping key in the hierarchy; and
   the step of establishing scan assignments is performed based on virtual partitions, wherein each virtual partition includes a plurality of partitions of the container.

8. The method of claim 6 wherein the at least one partition key is above the at least one grouping key in the hierarchy.

9. The method of claim 1 further comprising:
based at least in part on the number of partitions of the container to the number of slaves in the plurality of slaves, determining whether to perform partition-wise aggregation using the same slaves as are to be used to scan the container; and
wherein the step of establishing assignments based on partitions is performed in response to determining that partition-wise aggregation should be performed.

10. The method of claim 1 wherein the step of establishing scan assignments includes:
establishing said plurality of slave clusters, wherein the plurality of slave clusters includes a particular slave cluster that includes multiple scan slaves.

11. The method of claim 10 further comprising determining, based on the location of the slaves of said particular slave cluster, where to execute an aggregation slave that receives data items produced by the particular slave cluster.

12. The method of claim 11 wherein the aggregation slave and the slaves of the particular slave cluster are executed on the same node of a multiple node system.

13. The method of claim 10 wherein each slave of the particular slave cluster performs partial aggregation prior to redistributing the data items to an aggregation slave.

14. A machine-readable volatile or non-volatile medium storing one or more sequences of instructions which, when executed by one or more processors, causes the one or more processors to perform:
determining that at least one of the one or more grouping keys is related to at least one partition key used to establish partitions of the one or more containers;
in response to determining that at least one of the one or more grouping keys is related to at least one partition key, based on the partitions, establishing scan assignments that dictate which portions of the one or more containers are to be scanned by each slave cluster of a plurality of slave clusters, wherein each slave cluster includes one or more slaves;
establishing said scan assignments for the slave clusters on a partition-by-partition basis, such that no two slave clusters are assigned to scan the same partition;
each slave cluster of the plurality of slave clusters scanning one or more portions of the one or more containers based on the scan assignments; and
based on the one or more grouping keys, aggregating the data items scanned by the plurality of slave clusters;
wherein said scan assignments guaranty that when a particular slave cluster of the plurality of slave clusters scans any data item for a particular group established by the one or more grouping keys, then the particular slave cluster will scan all data items for the particular group.

15. The machine-readable volatile or non-volatile medium of claim 14, wherein the step of aggregating is performed by each slave of the plurality of slaves on the data items that are scanned by the slave.

16. The machine-readable volatile or non-volatile medium of claim 15, wherein the step of establishing scan assignments includes, for each partition of the container, assigning a single slave of the plurality of slaves to scan all rows of the partition.

17. The machine-readable volatile or non-volatile medium of claim 15, further storing one or more sequences of instructions which, when executed by one or more processors, causes the one or more processors to perform:
a particular slave receives an assignment that involves multiple partitions; and
the particular slave performs scans and aggregates data items from the multiple partitions one partition at a time, and sends the results of aggregating the data items of one partition before starting to scan any other partition.

18. The machine-readable volatile or non-volatile medium of claim 15, wherein said scan assignments guaranty that when any slave scans any data item for a particular group, then that slave will scan all data items for the particular group.

19. The machine-readable volatile or non-volatile medium of claim 14, further storing one or more sequences of instructions which, when executed by one or more processors, causes the one or more processors to perform:
based at least in part on the number of partitions of the container to the number of slaves in the plurality of slaves, determining whether to perform partition-wise aggregation using the same slaves as are to be used to scan the container; and
wherein the step of establishing assignments based on partitions is performed in response to determining that partition-wise aggregation should be performed.

20. The machine-readable volatile or non-volatile medium of claim 14, wherein the step of determining that at least one of the one or more grouping keys is related to at least one partition key includes determining that the at least one grouping key is hierarchically related to the at least one partition key.

21. The machine-readable volatile or non-volatile medium of claim 20, wherein:
the at least one partition key is below the at least one grouping key in the hierarchy; and
the step of establishing scan assignments is performed based on virtual partitions, wherein each virtual partition includes a plurality of partitions of the container.

22. The machine-readable volatile or non-volatile medium of claim 20, wherein the at least one partition key is above the at least one grouping key in the hierarchy.

23. The machine-readable volatile or non-volatile medium of claim 14, wherein the step of establishing scan assignments includes:
establishing said plurality of slave clusters, wherein the plurality of slave clusters includes a particular slave cluster that includes multiple scan slaves.

24. The machine-readable volatile or non-volatile medium of claim 23, further storing one or more sequences of instructions which, when executed by one or more processors, causes the one or more processors to perform:
determining, based on the location of the slaves of said particular slave cluster, where to execute an aggregation slave that receives data items produced by the particular slave cluster.

25. The machine-readable volatile or non-volatile medium of claim 24, wherein the aggregation slave and the slaves of the particular slave cluster are executed on the same node of a multiple node system.

26. The machine-readable volatile or non-volatile medium of claim 23, further wherein each slave of the particular slave cluster performs partial aggregation prior to redistributing the data items to an aggregation slave.

* * * * *

UNITED STATES PATENT AND TRADEMARK OFFICE
CERTIFICATE OF CORRECTION

| | |
|---|---|
| PATENT NO. | : 7,779,008 B2 |
| APPLICATION NO. | : 11/060260 |
| DATED | : August 17, 2010 |
| INVENTOR(S) | : Benoit Dageville et al. |

It is certified that error appears in the above-identified patent and that said Letters Patent is hereby corrected as shown below:

In column 3, line 24, before "DESCRIPTION" insert -- BRIEF --.

In column 5, line 51, delete "Heirarchical" and insert -- Hierarchical --, therefor.

Signed and Sealed this
Tenth Day of May, 2011

David J. Kappos
*Director of the United States Patent and Trademark Office*